United States Patent [19]
Songer

[11] Patent Number: 5,696,560
[45] Date of Patent: Dec. 9, 1997

US005696560A

[54] MOTION PICTURE DISTRIBUTION SYSTEM

[75] Inventor: Jimmie D. Songer, Burleson, Tex.

[73] Assignee: Magma, Inc., Fort Worth, Tex.

[21] Appl. No.: 454,654

[22] Filed: May 31, 1995

Related U.S. Application Data

[63] Continuation of Ser. No. 279,645, Jul. 25, 1994, abandoned.
[51] Int. Cl.[6] .......................... H04N 5/222; H04N 5/253; H04N 5/87
[52] U.S. Cl. .......................... 348/436; 348/434; 348/441; 348/445; 348/478
[58] Field of Search .......................... 348/434, 435, 348/436, 441, 445, 469, 478, 722, 911, 461; H04N 5/222, 5/253, 5/87, 3/36, 9/11

[56] References Cited

U.S. PATENT DOCUMENTS

| | | | |
|---|---|---|---|
| 4,296,431 | 10/1981 | Holland | 358/12 |
| 4,535,352 | 8/1985 | Haskell | 358/16 |
| 4,870,481 | 9/1989 | Kawamata | 358/31 |
| 4,897,722 | 1/1990 | Flory | 358/141 |
| 5,142,364 | 8/1992 | Sugimori et al. | 358/141 |
| 5,191,417 | 3/1993 | Skinner et al. | 358/141 |
| 5,280,540 | 1/1994 | Addeo et al. | 379/54 |
| 5,309,241 | 5/1994 | Hoagland | 348/222 |

OTHER PUBLICATIONS

Songer, Jim, "New Video West Instant Replay System is Reflex and Wireless," American Cinematographer (Jul. 1971), vol. 52, No. 7, pp. 668–669, 718–719.

Wales, Ken, "The Video West Inc. Three Dimensional Photographic System," American Cinematographer (Apr. 1974), vol. 55, No. 4, pp. 410–411, 446–471.

Primary Examiner—Glenton B. Burgess
Attorney, Agent, or Firm—David Newman & Associates, P.C.

[57] ABSTRACT

An improvement to a motion picture distribution system providing a high quality motion picture system compatible with pre-existing NTSC systems and improving horizontal and vertical detail. The improvement includes a television camera having an anamorphic lens, an encoder coupled to the television camera, and a decoder at a receiver. The anamorphic lens can have an aspect ratio of two to one, and compresses an entire motion picture viewing field into the NTSC-standard, four to three aspect ratio, to produce a horizontally-compressed image. The horizontally-compressed image is output from the television camera as a horizontally-compressed-image signal. The encoder encodes the horizontally-compressed-image signal as a composite-wideband-video signal having increased bandwidth, and generates a subcarrier-composite signal. The composite-wideband-video signal may be directly broadcast to a receiver or recorded by a recording device for subsequent transfer to a receiver, if the receiver is NTSC-compatible, the decoder generates a decoded-subcarrier-composite signal for use by the NTSC-compatible receiver. If the receiver includes a high quality system, then the high quality system uses the subcarrier-composite signal directly, demodulating the entire bandwidth of the composite-wideband-video signal to generate a motion picture image having a quality similar to a 35-mm film distribution print.

12 Claims, 8 Drawing Sheets

FIG. 5
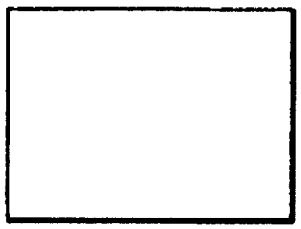
ACADEMY OR STANDARD
1.33:1
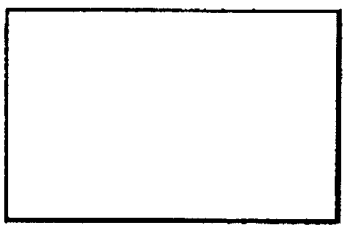
EUROPEAN WIDESCREEN
1.66:1
U.S. STANDARD WIDESCREEN
1.85:1
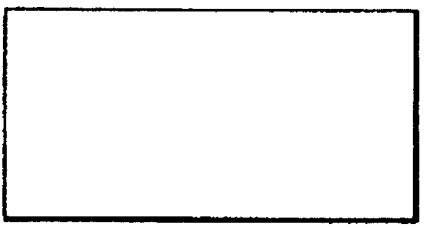
VISTA VISION
2.21:1
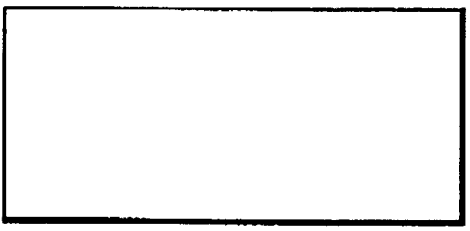
SUPER VISION
2.4:1

MOTION PICTURE DISTRIBUTION SYSTEM

This patent stems from a continuation application of patent application entitled, MOTION PICTURE DISTRIBUTION SYSTEM, having Ser. No. 08/279,645, and filing date Jul. 25, 1994 now abandoned. The benefit of the earlier filing date of the parent patent application is claimed pursuant to 35 U.S.C. § 120.

BACKGROUND OF THE INVENTION

This invention relates to motion pictures, and more particularly to a motion picture distribution system and method.

DESCRIPTION OF THE RELEVANT ART

Film, as a distribution medium for the motion picture industry, has served the industry well for the past hundred years. The current method of motion picture distribution of shipping duplicate copies of the master copy of a feature property, plus trailers, teasers, cross-plugs, publicity clips, trailer derby prints, product reels, and promotional rough cuts to exhibitors is very expensive in light of modern recording and telecommunications technology. Utilizing electronic technology for distribution presents some technical problems inherent to the electronic standards which this invention proposes to overcome.

Duplication of positive-film copies from a negative-film master, in spite of continuous improvements over the years, can create a noticeable variance between any two duplicate copies. Electronic recording technology is precise and replicates any number of copies with exacting results at a considerable cost savings over film.

Several transmission systems exist which can assure scheduled delivery of a consistently high quality product throughout the world. Some are more economically feasible than others at present, but they utilize a set of standards within which this invention proposes to operate. Delivery by satellite has been proven by the CATV industry and holds great promise for international distribution. Common carrier networks have served the broadcast television industry for many years and, with the advent of fiber optic cable, show tremendous potential.

For domestic U.S. distribution the use of laser disks linked with courier delivery seems the most economical form of delivery at present. This, of course, depends upon the feasibility of electronic projection systems, which are rapidly approaching theatrical display quality, for exhibition.

The MUSE system of high definition television (HDTV) in Japan provides superior vertical and horizontal resolution in addition to excellent color reproduction. The extraordinary high cost of its unconventional equipment plus the extremely wide bandwidth required to deliver the image, however, seem to eliminate this system from consideration. Even scan compression does not improve this system, as that procedure introduces motion artifacts.

Several other HDTV systems exist but their standards are unestablished and untested, and the equipment for their transmission and recording is yet undemonstrated and unproved.

The standard electronic picture suffers from certain problems inherent in the methods used in recording and displaying the electronic image. National Television System Committee (NTSC) artifacts such as chroma crawl, edge flicker (15 Hz), and half-line flicker (30 Hz) have been accepted in the television industry in exchange for various trade-offs, but such artifacts are not acceptable to the motion picture industry. The 4:3 Academy aspect ratio of NTSC cannot carry the full width of wide-screen format motion-picture films.

Attempts to utilize video tape for shooting motion pictures, indeed, for making features for television have not been successful, in spite of the obvious cost savings. The electronic image compares unfavorably with film and presents archival storage problems. The recording format for video has improved enough about every ten years to establish a new standard, driving the old format into obsolescence.

Piracy of film properties through video transfer is a serious problem lacking a technological, preventative film-medium solution. The CATV experience with piracy of the signal of satellite television distribution represents an even greater threat for new-release motion picture distribution. While many methods for encoding have been attempted to prevent unpaid reception of satellite-transmitted signals, an entire industry has arisen for devices which capture and decode these signals so that individuals may view and record the programming without reimbursement to the distributors or the cable systems. This is totally unacceptable to the motion picture industry.

Many in the motion picture industry believe that the extremely long delay in international distribution of feature U.S. films may create the demand for pirated versions and that a system that delivers a timely, high quality product might eliminate the piracy problem.

NTSC standards prescribe 6 MHz of bandwidth per channel for television transmitters and receivers. To meet motion-picture quality standards, a wider bandwidth is required, yet it must fit within the format of laser-disk recording and it should follow the NTSC standards.

SUMMARY OF THE INVENTION

A general object of the invention is a process for transducing a motion picture into a high-quality, wide-screen image suitable for a direct-broadcast-satellite system (DBS) and fiber-optic transmission or laser-disk recording and playback which provides adequate pixel information capable of meeting image quality of 35 millimeter motion-picture distribution prints.

A further object is reduction or elimination of NTSC artifacts, such as half-line flicker (30 Hz), chroma crawl, and edge flicker (15 Hz), while operating within the NTSC standard as much as possible.

Another object of the present invention is a process for encoding standard NTSC horizontally-compressed RGB image inputs into a composite signal which eliminates chroma crawl, edge flicker, and differential phase error.

Another object of the present invention is a process for decoding the composite wideband video signal to present RGB outputs for driving a video display device.

Another object of the present invention is to provide a process for changing the vertical deflection of anamorphic RGB inputs to present the information in the same aspect ratio of the original signal as coded in the vertical interval of the wideband signal.

A still further object of the present invention is to provide a 12 MHz bandwidth tuner to reconstruct decoding of the encoded information.

The present invention, as embodied and broadly described herein, provides an improvement to a motion picture distribution system, thereby providing a high quality motion picture system which has compatibility with a pre-existing NTSC system. The present invention improves horizontal and vertical detail. The improvement to this television system includes a television camera having an anamorphic lens, an encoder, a receiver, and a decoder. The anamorphic lens is connected to the television camera. The television camera must be capable of producing at least 600 pixels per horizontal line an the standard NTSC scanning race. Preferably, the television camera system has a subcarrier frequency of 3.579545 MHz. Alternatively, the improvement to a motion picture distribution system can include a telecine with a spherical lens system, an encoder, a receiver, and a decoder.

The anamorphic lens compresses an entire viewing field into the NTSC standard four to three aspect ratio. The anamorphic lens generates a horizontally-compressed image, which passes through the television camera in compressed-image format. When transducing a horizontally-compressed image from film, a spherical lens system transmits the horizontally-compressed film image through the telecine capturing the horizontally-compressed image in standard television 4:3 format. The signal outputs of the television camera are defined herein to be a horizontally-compressed-image signal, and include a standard NTSC composite output, a standard NTSC component output, and standard NTSC primary color signal RGB outputs.

The encoder is coupled to the television camera or telecine. The encoder encodes the horizontally-compressed-image RGB outputs to a composite-wideband-video signal, i.e., a subcarrier-composite signal with increased bandwidth, with a subcarrier frequency of 7.159090 MHz. The composite-wideband-video signal may be direct broadcast, for example, through a satellite system, or recorded by a recording device which is adapted to the higher subcarrier frequency. Alternatively, the composite-wideband-video signal may be distributed in a 7.159090 MHz format to a cable television system or a fiber-optic system. The composite-wideband-video signal is capable of producing up to 1,000 pixels per scan line with a 12 MHz bandwidth.

Following the receiver, the decoder decodes the signal at the subcarrier-composite signal frequency to generate an RGB wideband signal to be displayed. If an NTSC-compatible television with RGB inputs were connected to the RGB outputs of the decoder then the receiver would display a wideband image in the correct aspect ratio.

The present invention also provides a method for improving the quality of a motion picture distribution system. The method provides compatibility with existing NTSC systems, and also provides an improved horizontal and vertical detail for a high quality motion picture system. The method comprises the steps of imaging with a television camera capable of capturing at least 600 pixels per horizontal line at the standard NTSC scanning rate, and generating a horizontally-compressed image with an anamorphic lens. The method includes the step of converting the horizontally-compressed image to a horizontally-compressed-image signal. The steps further include encoding the horizontally-compressed-image signal as a composite-wideband-video signal, and generating the subcarrier frequency within the external encoder from the television camera as a subcarrier-composite signal.

At the receiver, if an NTSC-compatible television camera were used, then the steps would include decoding the subcarrier-composite signal to generate a RGB signal to be displayed. Additionally, the NTSC-compatible television camera would ordinarily scan a picture of at least a quality similar to that provided 35 millimeter distribution print film quality.

If a high quality receiver were used, then the high quality receiver would detect using the subcarrier-composite signal directly, and receive the entire bandwidth of the encoded-horizontally-compressed-image signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 5 shows various aspect ratios commonly used in motion picture exhibition;

DETAILED DESCRIPTION OF THE PREFERRED EMBODIMENTS

Figure 1:
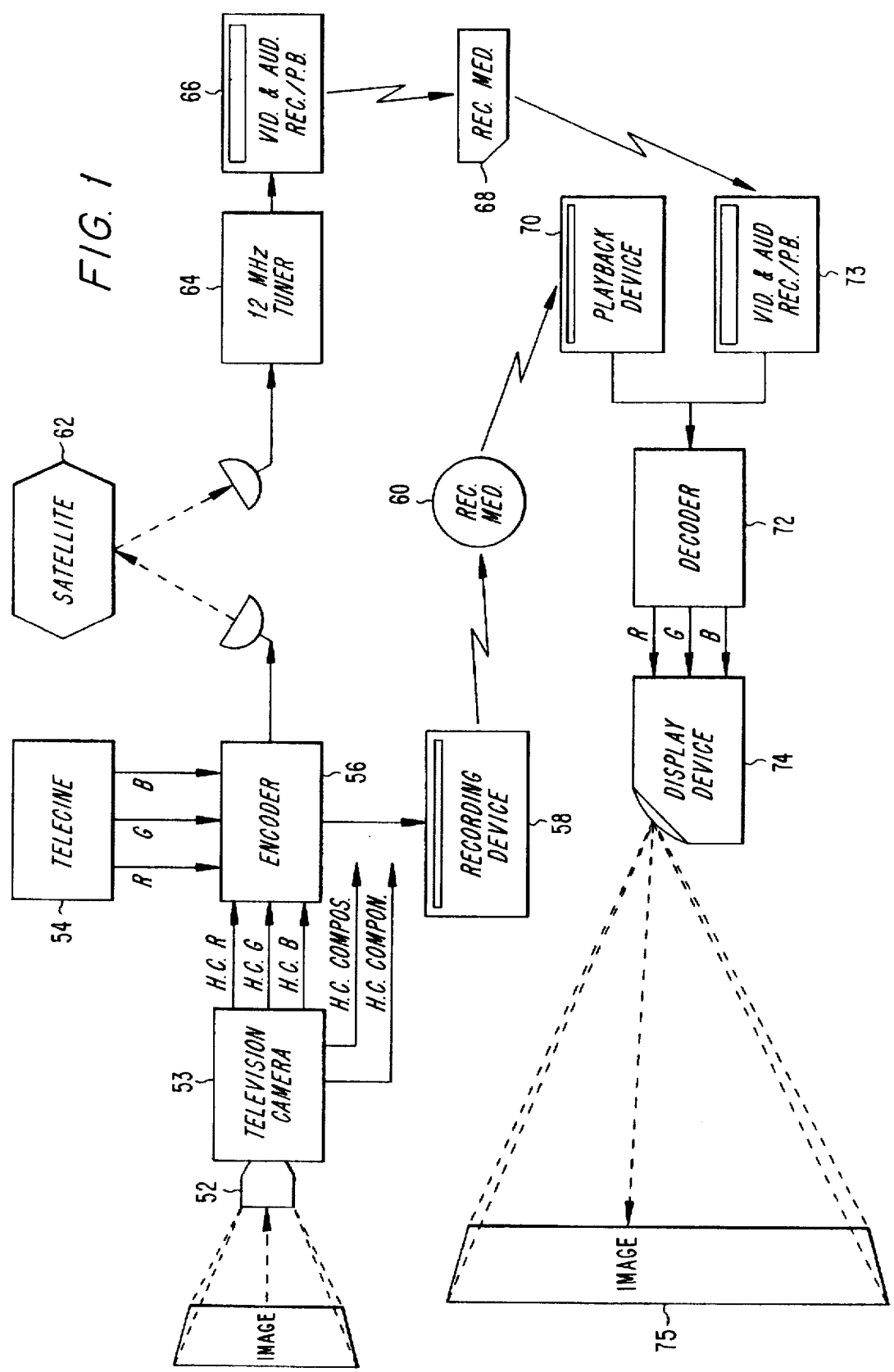
FIG. 1 is a system block diagram.

Reference now is made in detail to the present preferred embodiments of the invention, examples of which are illustrated in the accompanying drawings, wherein like reference numerals indicate like elements throughout the several views.

The present invention provides a novel process for transducing a motion picture into a high-quality, wide-screen image suitable for a direct-broadcast-satellite system (DBS) and fiber-optic transmission or laser-disk recording and playback. The pixel information meets image quality of 35 millimeter motion-picture distribution prints. NTSC artifacts, such as half-line flicker (30 Hz), chroma crawl, and edge flicker (15 Hz) are eliminated while operating within the NTSC standard as much as possible.

Broadly, a complementary anamorphic optical system is attached to a scanning television camera, or a spherical lens system is attached to a telecine, and the compressed image of the entire field is captured in the standard 4:3 format. The compressed image continues through the camera in the compressed-image format. The signal outputs of the camera or telecine include a standard NTSC composite output, a standard NTSC component output, and standard NTSC primary color signal RGB outputs.

An anamorphic system is used on a television camera in the same manner that an anamorphic system is used in filming motion pictures. The camera is positioned about one-half the distance to the subject, or with zoom lenses is brought to about one-half the focal distance. Moving the television camera closer effectively eliminates the NTSC image artifact known as half-line flicker (30 Hz) by doubling the distance node at which half-line flicker (30 Hz) occurs, and greatly increases vertical resolution because the anamorphic system stretches the vertical optical detail over a greater number of scanning lines.

Standard NTSC horizontally-compressed-image RGB inputs are encoded into a composite signal which eliminates three other video artifacts: chroma crawl, edge flicker, and differential phase error. Standard NTSC horizontally-compressed-image RGB inputs, generated either from television cameras or previously recorded signals, are input into an encoder producing a signal with increased bandwidth. This wider bandwidth signal may be broadcast directly, for example, through a satellite system, or recorded by a recording device adapted to the higher subcarrier clock frequency, or distributed in a 7.159090 MHz format to a CATV system or a fiber-optic system. This composite output is capable of producing up to 1,000 pixels per scan line with a 12 MHz bandwidth.

At the decoder, the composite wideband video signal is decoded to present RGB outputs for driving a video display device. The vertical deflection of anamorphic RGB inputs is transformed to present the information in the same aspect ratio of the original signal as coded in the vertical interval of the wideband signal. By degenerating the vertical deflection amplifier up to 50% of its normal operating height, the geometry area becomes proportional to the height of the screen.

The exemplary arrangement shown in FIG. 1 illustrates an overview of a motion picture distribution system according to the present invention. An anamorphic lens 52 of a selected aspect ratio is attached to a standard NTSC television camera 53, or a standard telecine 54 utilizing a standard spherical lens system is employed. The purpose of the anamorphic lens 52 is to map a wide-aspect-ratio field of view into an NTSC-aspect ratio. Thus, the anamorphic lens 52 modifies the conventional camera, e.g., by replacing the conventional lens, so as to produce a widescreen television signal corresponding to the increased aspect ratio, e.g., 5:3, of a widescreen high definition camera. When a telecine transduces a wide-screen motion picture, the motion picture is already horizontally compressed.

The television camera 53 or telecine 54 transmits horizontally-compressed-image RGB outputs to a wideband, harmonic encoder 56. The harmonic encoder 56 is explained in more detail below with reference to FIG. 2. The composite-wideband-video signal from the wideband, harmonic encoder 56 can be recorded by a recording device 58. The recording device 58 may be a recording or distribution means, such as a laser-disk recorder, capable of recording up to 8 MHz or greater bandwidth. The resultant recording medium 60, such as a laser disk, magnetic tape or digital storage device, may be delivered to an exhibitor.

Alternatively, the composite-wideband-video signal may be direct broadcast by a satellite system 62. The satellite system 62 would be capable of broadcasting up to 8 MHz or greater bandwidth, to a distributor or directly to the exhibitor. The exhibitor operates a 12 MHz tuner 64 which detects and processes the composite-wideband-video signal and records the composite-wideband-video signal on an audio and video wideband recorder/playback device 66, such as a commercial video-cassette recorder, using recording medium 68, such as a video cassette. As is practiced in the video recording arts, the information can be recorded on mass storage devices, optical recording/playback devices, and magnetic recording playback devices. As is also practiced in the video transmission arts, the signal can be transmitted via fiber optics or cable RF transmission.

In the case of the exhibitor who has received recording medium 60, a playback device 70, such as a laser disk player, samples and transmits the composite wideband video signal through a wideband harmonic decoder 72, explained in more detail below and in FIG. 3, to the display device 74. The display device 74 projects the resulting image onto a display screen 75.

In the case of the direct-broadcast, composite wideband signal, the recording medium 68 is sampled by a video and audio recorder/playback device 73 and transmitted through the wideband harmonic decoder 72 to the display device 74 for display of the image on the display screen 75.

Figure 2:
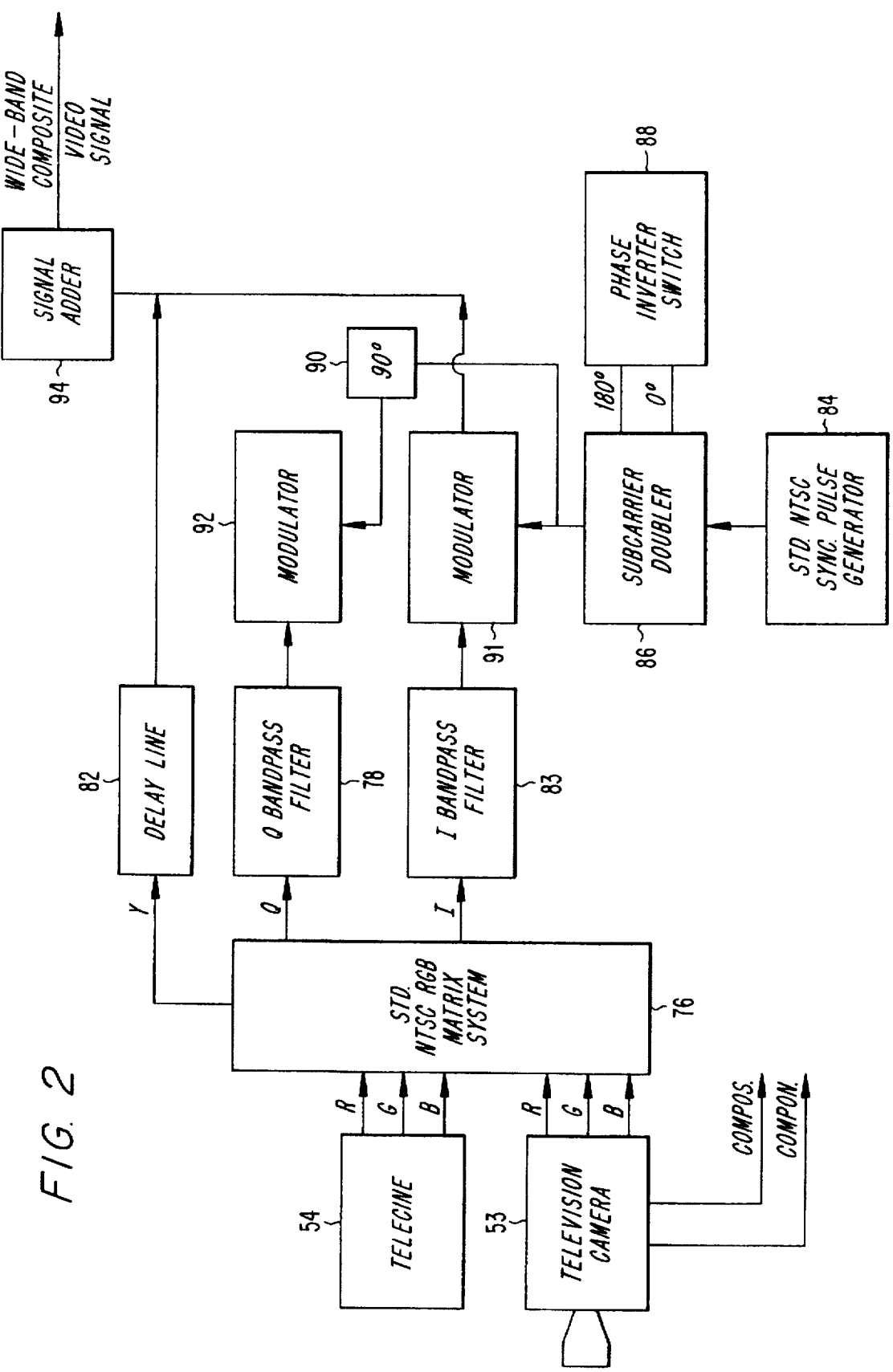
FIG. 2 shows how the horizontally-compressed images from the color camera are processed in the encoder for transmission or recording.

In FIG. 2 the horizontally-compressed-image RGB signals from the color television camera 53 or telecine 54 are fed into a standard NTSC RGB matrix system 76, producing the signals Y, Q, and I. The Q signal is passed through a Q-bandpass filter 78, and the I signal is passed through an I-bandpass filter 83, limiting the bandwidth of the I and Q matrixed information, yet producing a bandwidth greater than the prevailing NTSC standard, allowing for greater color pixel detail.

Signal Y passes through delay line 82 increasing the standard NTSC Y-channel delay to be coincident with I and Q balanced modulator outputs. A standard NTSC synchronization-pulse generator 84 produces timing pulses and a subcarrier signal, framing synchronization for the harmonic encoder 56, and produces a sine wave which passes to a subcarrier doubler 86, and to modulator 91 and through 90° phase shift network 90 to modulator 92. The subcarrier doubler 86 increases the modulators' subcarrier rate to 7.159090 MHz, twice the NTSC standard of 3.579545 MHz. The subcarrier doubler 86 also phase inverts the chroma subcarrier into two fields, one 0°, and one 180°, alternatively, at the vertical field rate. Doubling the harmonic of the subcarrier rate changes the color field interlace from 4:1 to 2:1. These phase angles are fed to a phase invertor switch 88 synchronous to the vertical field rate which switches the 7.159090 MHz rate alternatively from 0° reference phase to 180° reference phase to the balanced modulators 91, 92 correcting the differential phase error in transmission which causes color contamination.

The signal R-Y output from modulator 91 and B-Y output from modulator 92 are added in the signal adder 94 to the delayed Y information to produce a composite-wideband-video signal which may be distributed by direct broadcast via a 12 MHz transmitter or recorded by a wideband, recording device.

The color subcarrier frequency is set to 7.159090 MHz and the brightness signal and chrominance signal are interleaved with each other. The frequency bandwidths of the brightness signal and the color difference signals are transmitted in the double-sideband mode. In this manner the brightness signal and chrominance signal have wider frequency bandwidths than those of the NTSC system, so that the horizontal resolution and color reproducibility can be improved materially. By choosing a color subcarrier frequency of 7.159090 MHz, i.e., the second harmonic of the standard NTSC subcarrier, equipment can be designed for the system of the present invention which are easily compatible with existing NTSC-type equipment through the addition of only a few circuits. To convert the typical NTSC encoder described above for use in the system of this invention, it is merely necessary to pass the incoming 3.579545 MHz color subcarrier frequency generated by the conventional equipment through a frequency multiplier which doubles the standard color subcarrier frequency. The resulting carrier signal is then applied to the B-Y modulator through a 90° phase shift circuit. The additional synchronization necessary for the timing of the invertor sequences at the receiving end is provided by a second synchronizing burst at the doubled color subcarrier frequency immediately following the burst produced by a burst generator, e.g. 3.579545 MHz. This second burst, 7.159090 MHz, is produced by a burst generator. The other reference points are at 15 MHz and at 3.579545 MHz which enables the equalizing circuitry to determine a truer frequency equalization curve. The two carrier signals which are modulated by the R-Y and B-Y signals, respectively, are both inverted, though at different rates. Typically, one carrier signal, usually the R-Y channel, may be inverted from line to line while the other is inverted from field to field.

If the source of the composite wideband video signal were the recording medium 60 in. FIG. 1, then the composite wideband video signal of the motion picture is sampled and transmitted by playback device 70 into the wideband harmonic decoder 72.

Figure 3:
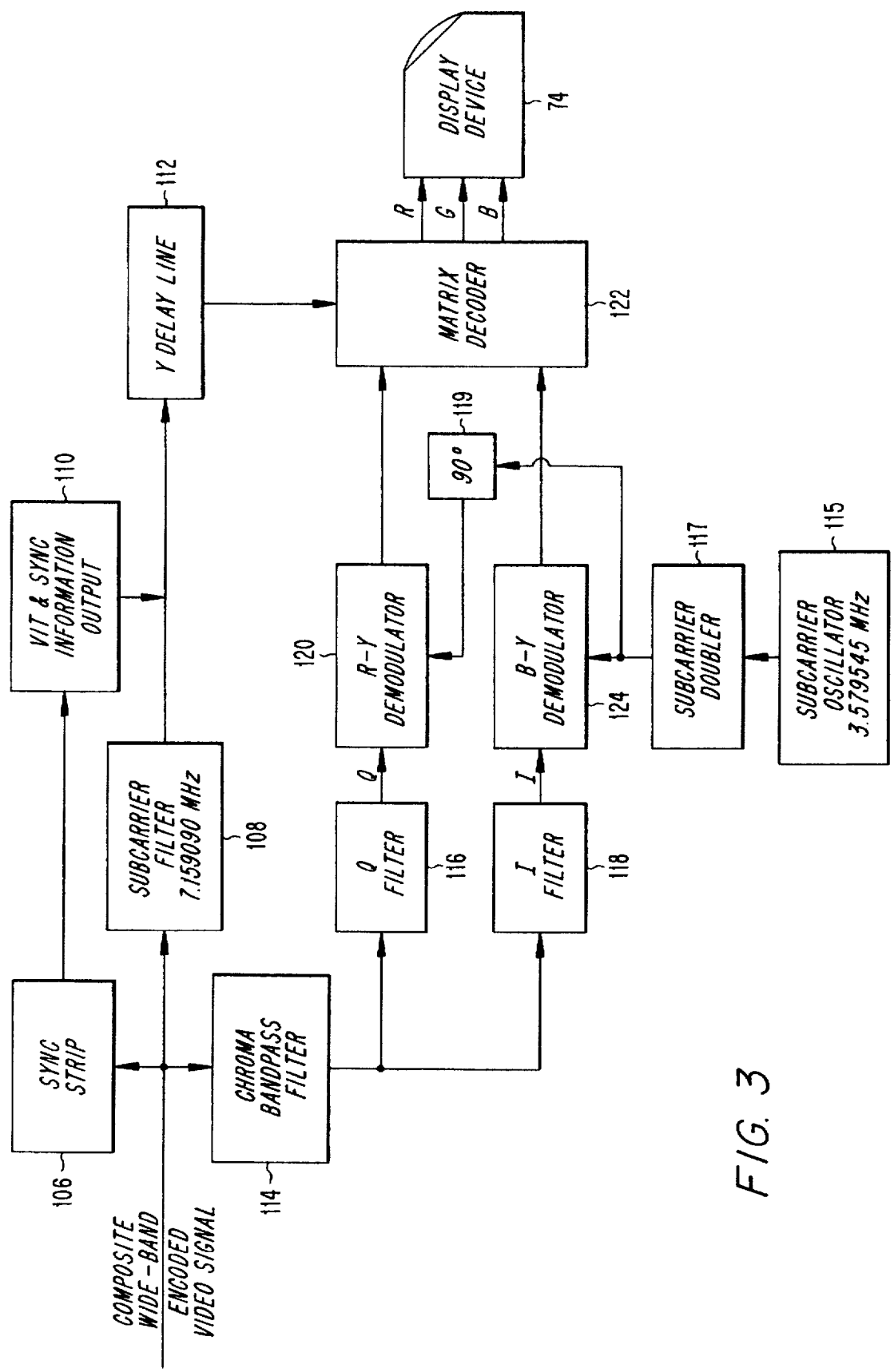
FIG. 3 is a block diagram of the decoder.

In FIG. 3 the composite wideband video signal from a playback device enters the wideband harmonic decoder, where the composite-wideband-video signal is input to a synchronization stripper 106, a 7.159090 MHz subcarrier filter 108, and a chroma-bandpass filter 114.

The synchronization stripper 106 strips the synchronization pulse from the composite-wideband-video signal to synchronize the VIT and synchronization information output, genlocking the decoder to the original synchronization timings.

The 7.159090 MHz subcarrier filter 108 removes the subcarrier from the signal, producing a Y signal. This Y signal, in combination with the VIT and synchronization information signal generated from VIT and synchronization generator 110, enters a Y delay line 112.

The chroma-bandpass filter 114 removes the I and Q color portion from the composite wideband video signal and is input to a Q filter 116 and to an I filter 118.

The Q filter 116 limits the signal with appropriate bandwidth for R-Y demodulation, becoming the Q signal. The I filter 118 limits the signal with appropriate bandwidth for B-Y demodulation, becoming the I signal.

The Q signal passes through the R-Y demodulator 120 creating the R-Y signal, and into the matrix decoder 122.

The I signal passes through the B-Y demodulator 124 creating the B-Y signal and into the matrix decoder 122.

A subcarrier oscillator 115 produces timing pulses and a subcarrier signal of 3.579545 MHz, and produces a sine wave which passes to a subcarrier doubler 117 and through 90° phase shift network 119 to the R-Y demodulator 120.

The R-Y signal and the B-Y signal combine with the Y signal in the matrix decoder 122 which outputs the RGB signals containing the wideband information for RGB reproduction in a display device 74.

In a system in which the display device 74 is a single-lens projector, the anamorphic source image can be corrected by passing the compressed image from the display device 74 through a complementary anamorphic lens attached to the display device 74, decompressing the compressed image, as is done routinely in the motion picture industry.

If the display device 74 were a multiple CRT-type projector, then the correction is induced by adjusting the vertical deflection driver in the projector as is done routinely in the motion picture industry.

This aspect ratio transformation reversal can be accomplished by a second anamorphic lens at the optical output of the projector. This is most suitable for an LCD type projector. Alternatively, for a CRT type projector, the aspect ratio transformation can be reversed electronically by adjusting the horizontal or vertical deflector amplifier gain in the projector.

Simultaneous to the generation of the horizontally-compressed-image RGB signals by the television camera 53 or telecine 54 in FIG. 1, an NTSC composite signal of a horizontally compressed image is also generated by the television camera. A pulse may be inserted into the vertical interval of the NTSC composite signal for a standard pan and scan routine which selects that portion(s) of the widescreen image which fits the NTSC standard 4:3 aspect ratio. The NTSC composite signal would then input to a real-time resampling chip to expand or reduce the image dimension using interpolation or decimation, geometrically correcting that part of the compressed image for standard broadcast or video recording.

Figure 4:
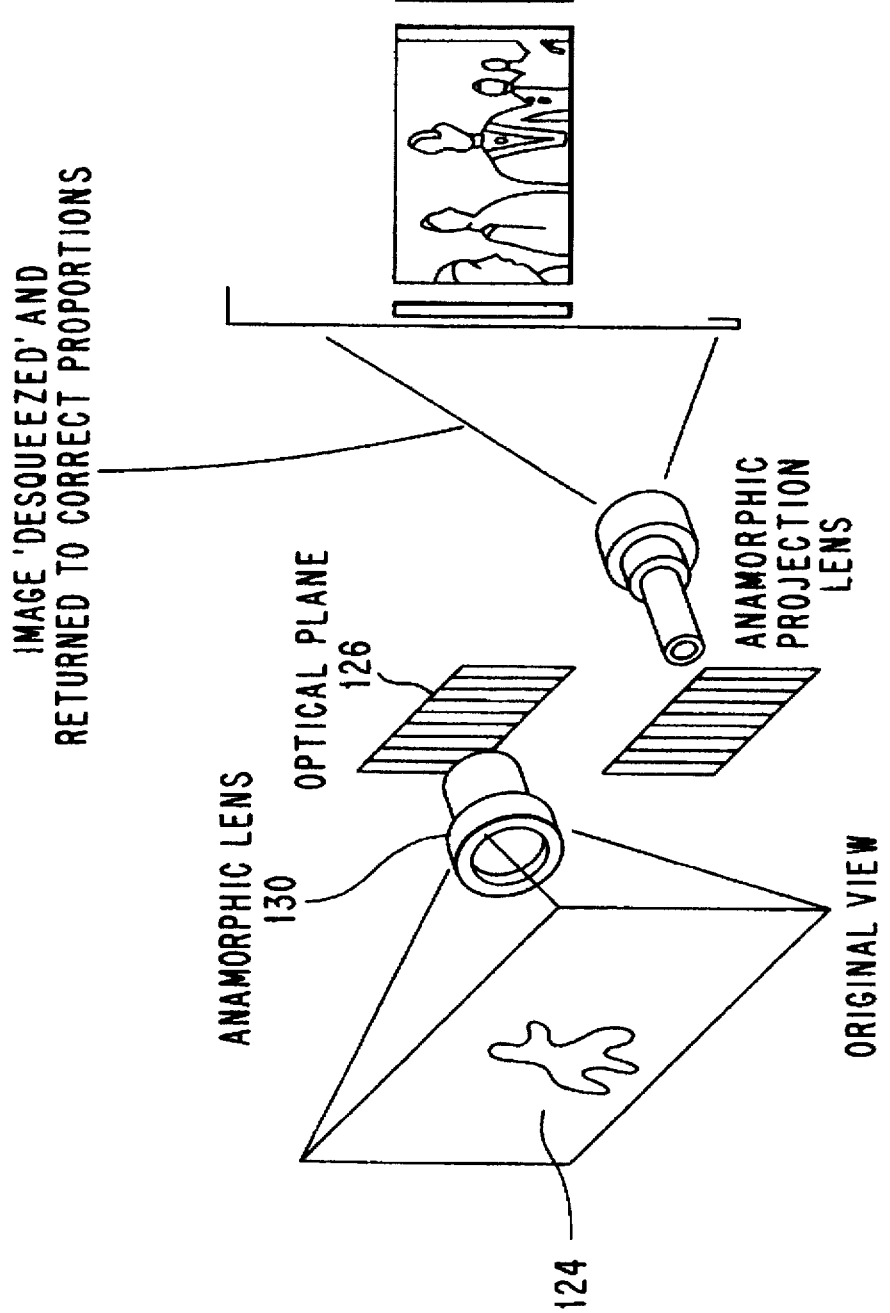
FIG. 4 illustrates how an anamorphic lens squeezes an image and how, in the prior art, an anamorphic lens unsqueezes the squeezed image.

The wide-screen image of subject 124 in FIG. 4 has been recorded in a horizontally compressed format, using an anamorphic lens 130, on the standard 4:3 aspect ratio optical plane 126. Various aspect ratios in which subject 124 could have been filmed are shown in FIG. 5.

Figure 6:
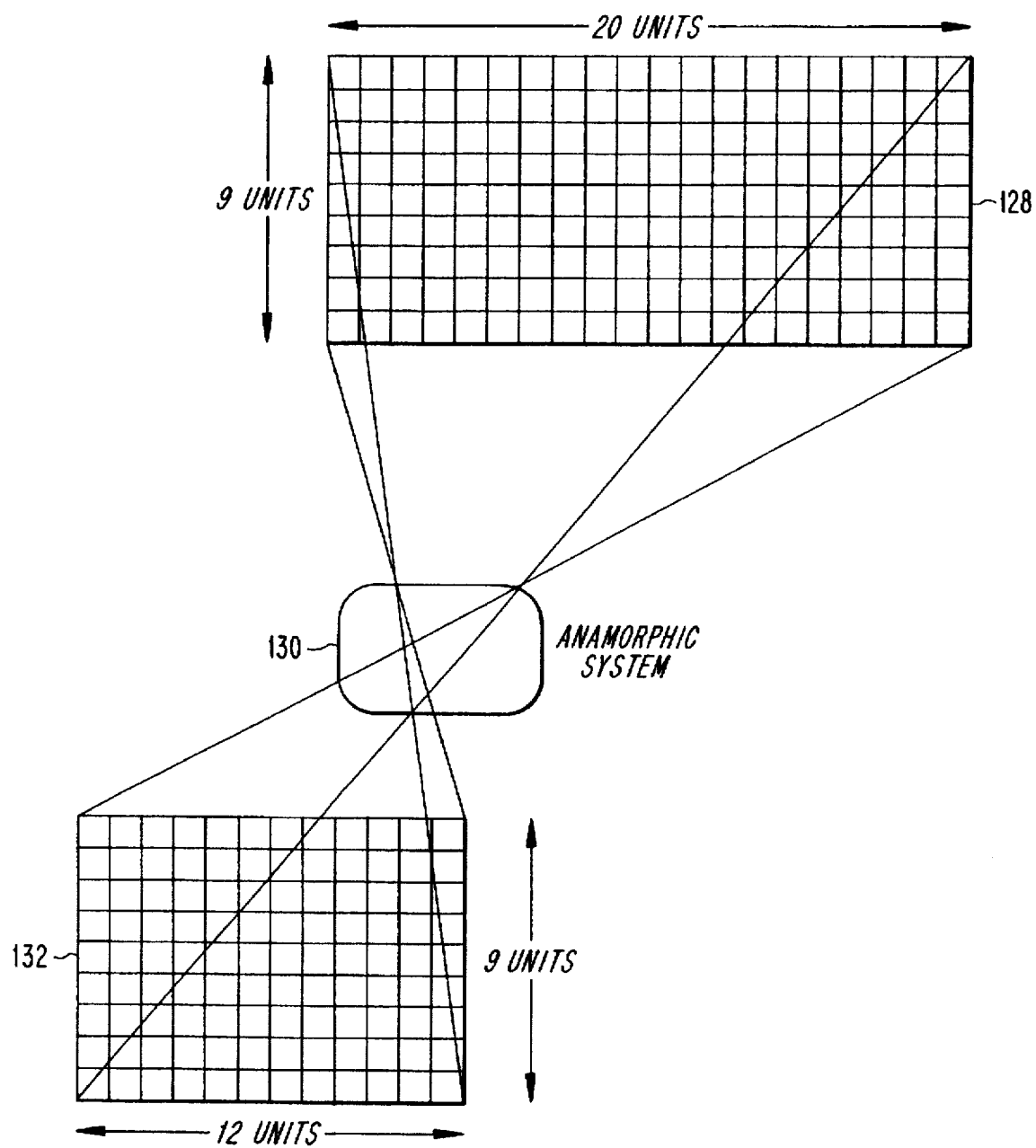
FIG. 6 explains how a coordinate 20:9 Vista Vision aspect ratio image is compressed and recorded on a 4:3 NTSC field.

In FIG. 6, subject 128 represents a coordinate image 20 horizontal units wide, i.e., 20 vertical columns, by 9 vertical units deep, i.e., 9 horizontal rows, approximately the aspect ratio of Vista Vision, 2.21:1. The image represented by subject 128 passes through anamorphic lens 130 and is transduced on optical plane 132 in a 4:3 format, with the 9 horizontal rows from subject 128 unchanged in optical plane 132, while the 20 vertical columns have been horizontally compressed by the anamorphic lens system into 12 units of width, resulting in an aspect ratio of 12:9 or 4:3.

Figure 7A:
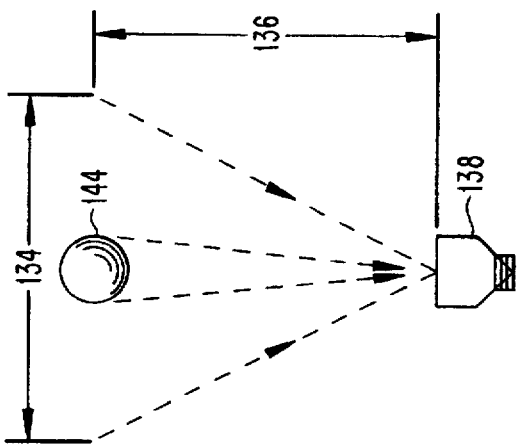
FIGS. 7A and 7B depict an object captured in one field of a television image frame through a spherical lens in a distant nodal position to capture a certain field of view.
Figure 7B:
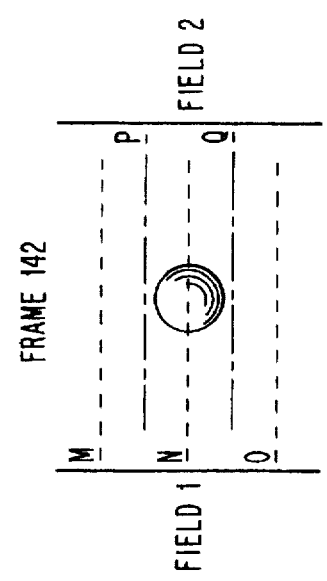

In FIG. 7A, a ball 144 is centered in field of view 134 at a positioned distance 136 from a standard, spherical lens 138. The standard, spherical lens 138 focuses the scan lines, shown in FIG. 7B, of Field 1 and Field 2 of a television image frame 142. Field 1 and Field 2 are scanned 1/60 second apart from each other according to NTSC standards. The image of ball 144 has been partially scanned by Line N of Field 1. Precisely 1/60 second later, Line P and Line Q in Field 2 scan the field of view but do not scan any part of ball 144. The series of sequential field scans can continue with the image of ball 144 appearing alternately only in Field 1 of the image frame every 1/60 second, producing the effect known as line flicker to the human eye.

Figure 8A:
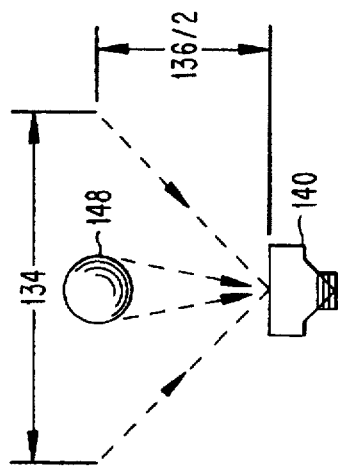
FIGS. 8A and 8B depict an object captured in two fields of a television image frame through an anamorphic system in a different nodal position necessary to capture the same field of view.
Figure 8B:
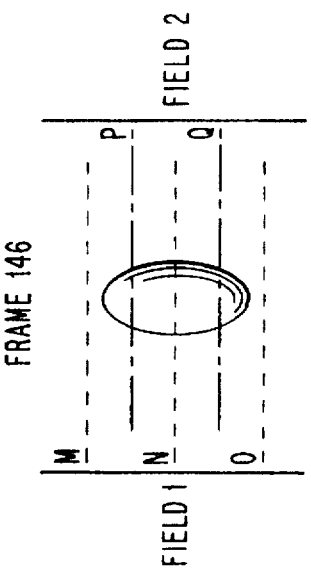

In FIG. 8A, a ball 148 is centered in the same field of view 134, positioned one-half the distance node 136 from a 2:1 anamorphic lens 140 which focuses the scan lines, shown in FIG. 8B, on Field 1 and Field 2 of a television image frame 146. The image of ball 148 represents the same ball depicted as in the image of ball 144 in FIG. 7A. The image of ball 148 is twice as large as the image of ball 144 because the 2:1 anamorphic lens 140 of the camera (not shown) is closer by a factor of 2, and the anamorphic lens 140 is elliptical by a proportion of 2:1 as a result of the anamorphic lens squeezing the horizontal dimension of the diameter in half but leaving the vertical dimension of the diameter unchanged, though doubled in size. Line P and Line Q of Field 2 and Line N of Field 1 all scan the image of ball 148, thus the image of ball 148 appears in both fields during each scan, removing the appearance of half-line flicker to the human eye.

In a situation where the camera position is fixed, the same effect would be obtained by attaching an anamorphic zoom lens to the television camera and doubling the focal length to achieve the same horizontal ratio.

Figure 9:
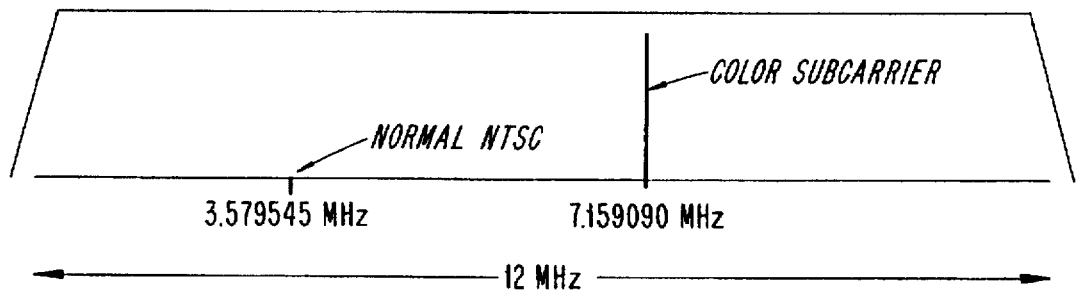
FIG. 9 compares the frequency spectrums for a standard NTSC 6 MHz signal and the composite wideband signal of this invention.

FIG. 9 depicts the frequency spectrums for a standard NTSC 6 MHz signal having a subcarrier frequency of 3.579545 MHz and the composite wideband 12 MHz signal having a subcarrier frequency of 7.159090 MHz of this invention.

The above principle would apply if the television standard were PAL or SECAM.

Figure 10:
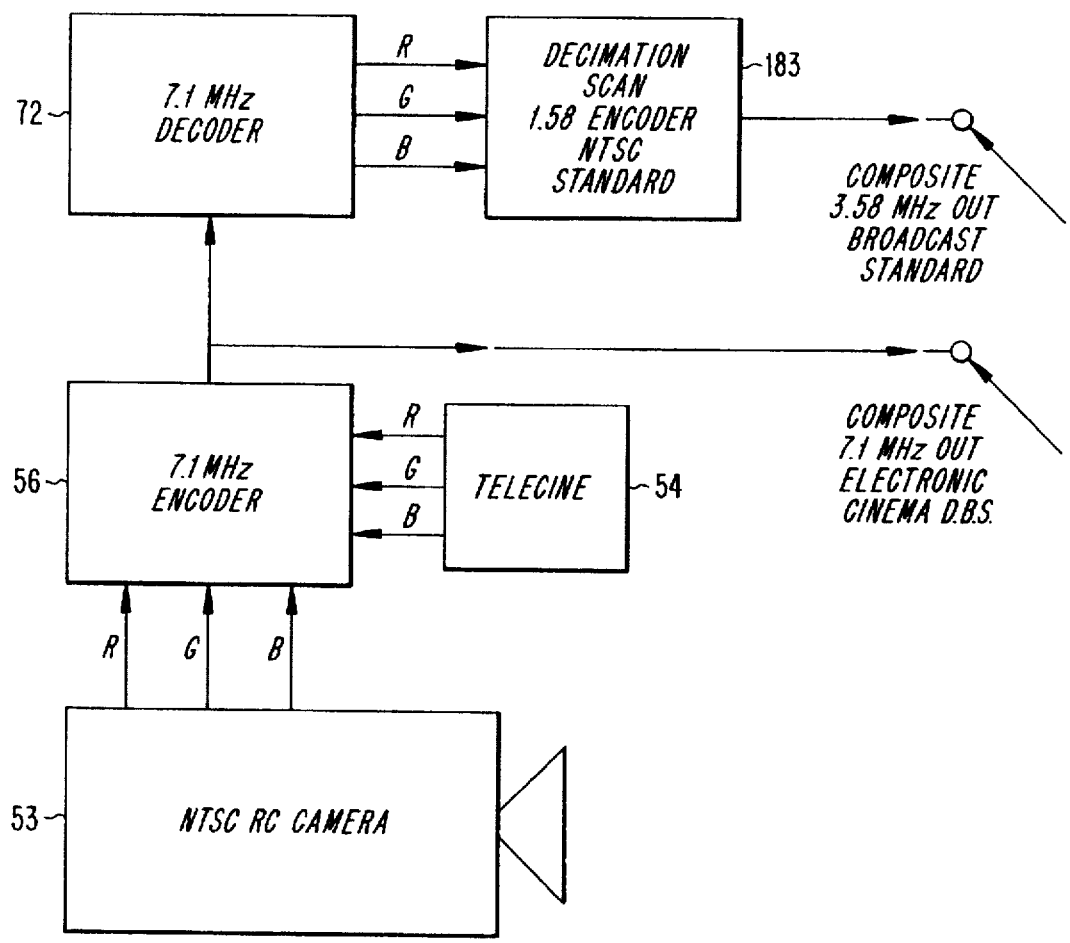
FIG. 10 is a block diagram for generating an NTSC format from the wideband 7.159090 MHz information.

FIG. 10 illustrates how the present invention may be used with an NTSC standard television camera. The television camera 53 or telecine 54 is connected to the encoder 56. The encoder 56 is coupled to the wideband harmonic decoder 72. The wideband harmonic decoder 72 is coupled to a decimation, scan and 3.579545 MHz NTSC encoding device 183. The television camera 53 or telecine 54, encoder 56 and wideband harmonic decoder 72 operate as previously described. The decimation, scan and 3.579545 MHz NTSC encoding device 183 performs additional functions which are discussed in the following paragraphs.

As shown in FIG. 10 the RGB signals come from the television camera 53 or telecine 54 to encoder 56. A communications channel recording medium or other device may be inserted between the encoder 56 and the wideband harmonic decoder 72. The output of the wideband harmonic decoder 72 is the RGB signals.

The decimation, scan and 3.579545 MHz NTSC encoding device 183 performs three additional functions: geometry correction, horizontal scanning, and re-encoding. The first objective of the decimation, scan and 3.579545 MHz NTSC encoding device is to convert the RGB signals from the wideband harmonic decoder 72 into a format that is compatible with the geometry and format of the standard NTSC signal. A problem arises in that in order to go back to the standard NTSC broadcast signal, the output of the signal from the wideband harmonic decoder 72 has to be corrected to remove the distortion from the anamorphic lens. The decimation, scan and 3.579545 MHz NTSC encoding device 183 corrects the geometry from the anamorphic lens, essentially converting the anamorphic aspect ratio back to a four to three aspect ratio. This can be done by vertically removing pixels from the signal output from the wideband harmonic decoder 72.

The horizontal scanning function of the decimation, scan and 3.579545 MHz NTSC encoding device 183 encodes into a vertical interval information for the standard NTSC, PAL or SECAM audience. More particularly, since the signal from the anamorphic lens requires a wider screen than does a normal NTSC signal, a technical director can direct the scan device to select any four to three portion of the wide screen image for viewing on a standard NTSC, PAL or SECAM receiver. For example, if two people were being interviewed on a screen, in a wide screen scenario both can be observed; in the narrower screen NTSC, PAL or SECAM scenario, however, the technical director can select which subject he wishes to observe through the generation of electronic codes. This function of the decimation, scan and 3.579545 MHz NTSC encoding device is standard to the film industry but represents a new addition to the television industry.

The re-encoding function of the decimation, scan and 3.579545 MHz NTSC encoding device 183 re-encodes the signal output from the wideband harmonic decoder 72 back into a 3.579545 MHz composite NTSC signal for displaying the visual image using an NTSC-compatible television receiver.

It will be apparent to those skilled in the art that various modifications can be made to the motion picture distribution system of the instant invention without departing from the scope or spirit of the invention, and it is intended that the present invention cover modifications and variations of the motion picture distribution system provided they come within the scope of the appended claims and their equivalents.

I claim:

1. A method for improving a motion picture distribution system, using a telecine with a standard spherical lens system to record on a video recording medium, comprising the steps of:

transducing a horizontally-compressed widescreen, full color, motion picture image exposed and processed on film with an original aspect ratio to a standard video format to generate horizontally-compressed 4:3 RGB video signals;

transmitting the horizontally-compressed 4:3 RGB video signals to a wideband harmonic encoder coupled to RGB outputs of the telecine;

deriving R-Y, B-Y and Y from the horizontally-compressed 4:3 RGB video signals;

generating a subcarrier signal with a subcarrier frequency;

doubling the subcarrier frequency to 7.159090 MHz;

modulating the doubled subcarrier frequency with R-Y and B-Y information;

combining Y information with the R-Y and B-Y subcarrier information and forming a horizontally-compressed 4:3 wideband composite video signal with synchronization;

uplinking to a satellite broadcasting system and direct broadcasting the horizontally-compressed 4:3 wideband composite video signal;

downlinking the horizontally-compressed 4:3 wideband composite video signal to a receiving antenna;

receiving and detecting, with a 12 MHz television tuner, the horizontally-compressed 4:3 composite video signal;

inputting the horizontally-compressed 4:3 wideband composite video signal to a wideband audio/video recording and playback device;

decoding the horizontally-compressed 4:3 wideband composite video signal; and displaying the horizontally-compressed 4:3 wideband composite video signal in the original aspect ratio.

2. The method as set forth in claim 1 further comprising, after the step of inputting, the steps of:

recording the horizontally-compressed 4:3 wideband composite video signal on a recording medium;

transferring the recording medium to a second wideband audio/video recording and playback device; and playing the recording medium on the second wideband audio/video recording and playback device.

3. An improvement to a motion picture distribution system, for enhancing horizontal and vertical detail of a horizontally-compressed widescreen photographic motion-picture image filmed with a particular aspect ratio on 4:3 film, comprising:

means for transducing a full-color horizontally-compressed 4:3 film image into a horizontally-compressed 4:3 RGB video signal;

encoder means coupled to said transducing means, for encoding the horizontally-compressed-RGB-video signal as a horizontally-compressed 4:3 wideband composite video signal, for generating a 3.579545 MHz subcarrier signal, and for doubling the subcarrier signal, the horizontally-compressed 4:3 wideband composite video signal including an aspect ratio code embedded in a vertical interval of the horizontally-compressed 4:3 wideband composite video signal;

decoder means for decoding the horizontally-compressed 4:3 wideband composite video signal using the subcarrier signal, to generate an RGB signal;

decimation, scanning and encoding means for modifying the RGB signal; and an NTSC-compatible display device, coupled to said decoder means, for displaying the RGB signal and for determining, from the aspect ratio code, an adjustment to a vertical deflection driver for projecting the RGB signal in the particular aspect ratio of the horizontally-compressed widescreen photographic motion-picture image as originally filmed at a quality similar to a 35-mm film distribution print.

4. The improvement as set forth in claim 3 with said encoder means further comprising:

a Q-signal bandpass filter;

an I-signal bandpass filter;

a Y-signal delay line;

a first modulator coupled to said Q-signal bandpass filter;

a second modulator coupled to said I-signal bandpass filter;

a phase shift network coupled to said first modulator;

a subcarrier doubler coupled to said second modulator and, through a 90° phase shift network, to said first modulator;

a synchronization pulse generator coupled to said subcarrier doubler;

a phase inverter switch coupled to said subcarrier doubler; and a signal adder coupled to an output of said first modulator, said second modulator, and said Y-signal delay line.

5. The improvement as set forth in claim 3 with said decoder means further comprising:

a synchronization stripper for stripping a synchronization pulse from the horizontally-compressed 4:3 wideband composite video signal to generate a VIT and synchronization information output;

a 7.159090 MHz subcarrier filter for removing chroma information from the horizontally-compressed 4:3 wideband composite video signal to generate a Y signal;

a Y-signal delay line for receiving the Y signal and the VIT and synchronization information output;

a chroma-bandpass filter for removing an I-color portion and a Q-color portion from the horizontally-compressed 4:3 wideband composite video signal;

a Q filter, coupled to said chroma-bandpass filter, for generating a Q-signal;

an I filter, coupled to said chroma-bandpass filter, for generating an I-signal;

an R-Y demodulator coupled to said Q filter for receiving the Q-signal and for generating an R-Y signal;

a B-Y demodulator coupled to said I filter for receiving the I-signal and for generating a B-Y signal;

a subcarrier doubler coupled to said B-Y demodulator and, through a 90° phase shift network, to said R-Y demodulator;

a subcarrier oscillator coupled to said subcarrier doubler; and a matrix decoder, coupled to said R-Y demodulator, to said B-Y demodulator, and to said Y-signal delay line, for combining the R-Y signal, the B-Y signal and the Y signal, and for outputting the horizontally-compressed 4:3 wideband composite video signal to the display device.

6. The improvement as set forth in claim 3 with said decimation, scanning and encoding means for performing at least one of geometry correction to remove distortion, horizontal scanning of a wide screen image to respond to embedded pan and scan codes in a vertical interval, and re-encoding of the RGB signal.

7. A method for improving a motion picture distribution system, using a television camera with an anamorphic lens, comprising the steps of:

imaging a wide-aspect-ratio field of view with a selected NTSC-aspect ratio on 4:3 film, using the anamorphic lens, as a horizontally-compressed image having at least 600 pixels per horizontal line, the horizontally-compressed image having horizontally-compressed-image RGB outputs;

encoding the horizontally-compressed image as a wideband composite video signal having an aspect ratio code embedded in a vertical interval of the wideband composite video signal, the aspect ratio code corresponding to the selected NTSC-aspect ratio;

uplinking and broadcasting the wideband composite video signal;

downlinking, at a receiver, the wideband composite video signal;

detecting the wideband composite video signal as horizontally-compressed image RGB inputs;

adjusting, responsive to the aspect ratio code, the horizontally-compressed image RGB inputs to present the wideband composite video signal in the selected NTSC-aspect ratio; and projecting the adjusted wideband composite video signal as a displayed image of the wide-aspect-ratio field of view having the selected NSTC-aspect ratio.

8. The method as set forth in claim 7, the step of adjusting further comprising:

transforming a vertical deflection of the horizontally-compressed image RGB inputs by adjusting a vertical deflection driver.

9. The method as set forth in claim 7, the step of adjusting further comprising:

decompressing the horizontally-compressed-image RGB inputs using a complementary anamorphic lens.

10. The method as set forth in claim 1 with the original aspect ratio being any one of 1.66:1, 1.85:1, 2.05:1, 2.21:1, 2.35:1, 2.4:1, and 2.76.1.

11. The method as set forth in claim 3 with the particular aspect ratio being any one of 1.66:1, 1.85:1, 2.05:1, 2.21:1, 2.35:1, 2.4:1, and 2.76.1.

12. The method as set forth in claim 7 with the selected NTSC-aspect ratio being any one of 1.66:1, 1.85:1, 2.05:1, 2.21:1, 2.35:1, 2.4:1, and 2.76.1.

* * * * *